C. I. DICKERSON.
AIR CUSHION.
APPLICATION FILED AUG. 1, 1913.
1,147,148.
Patented July 20, 1915.
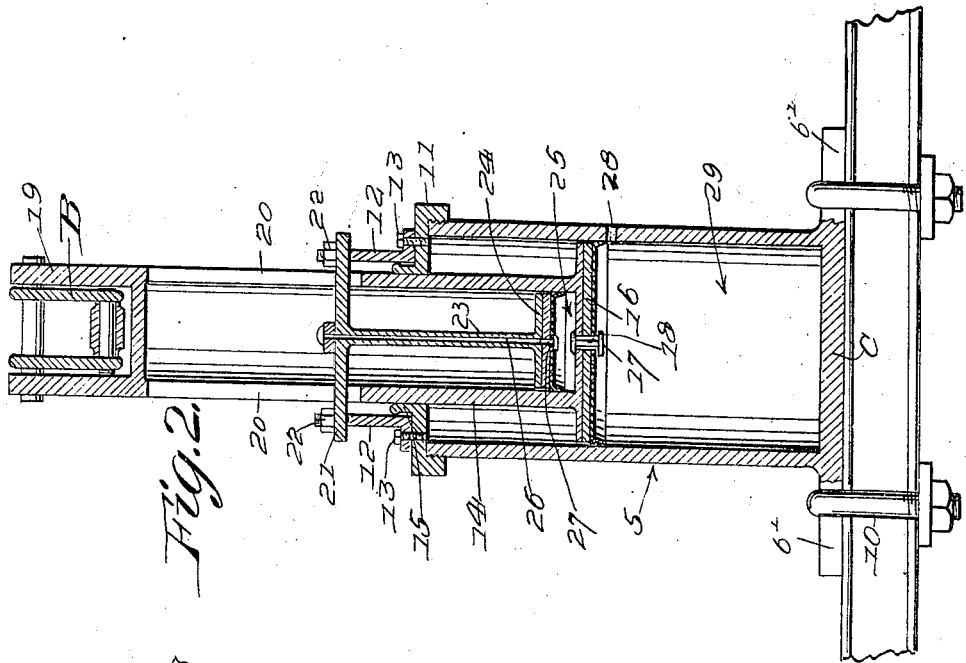
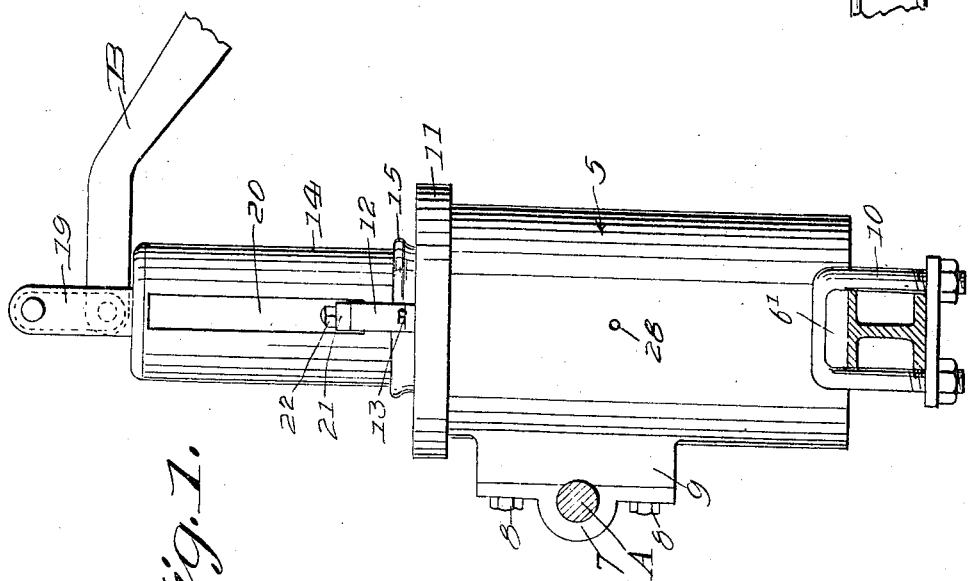
Witnesses
L. Wordsworth
W. H. Brereton
Inventor
Charles I. Dickerson.
By P. Peale Henick
Attorney

UNITED STATES PATENT OFFICE.

CHARLES I. DICKERSON, OF DUCHESNE, UTAH.

AIR-CUSHION.

1,147,148.   Specification of Letters Patent.   Patented July 20, 1915.

Application filed August 1, 1913. Serial No. 782,451.

*To all whom it may concern:*

Be it known that I, CHARLES I. DICKERSON, a citizen of the United States, residing at Duchesne, in the county of Wasatch and State of Utah, have invented new and useful Improvements in Air-Cushions, of which the following is a specification.

This invention relates to the construction of an automobile or vehicle air cushion adapted to be secured between the vehicle frame and its axle, and provided with a main load sustaining air chamber and a means adapted to receive the recoil and to force air into the main load sustaining chamber.

One of the objects of the invention is the provision of a load sustaining device, which will be self adjustable under varying road conditions and which will render the use of air filled rubber tires unnecessary.

Another object of the invention is the construction of a practical air cushion spring in which a pump operates to increase the compression of the air in the load sustaining chamber, so that the air in this chamber will be under sufficient pressure to resist extreme vertical movements of the vehicle, due to its passing over boulders and deep ruts.

With the above and other objects in view the invention relates to certain new and useful combinations, constructions and relations of parts, clearly set forth in the following specification and, clearly shown in the accompanying drawings, in which:—

Figure 1 is a side elevation showing the device applied to a vehicle axle and frame. Fig. 2 is a vertical longitudinal sectional view.

Referring to the accompanying drawings 5 designates a main air compression cylinder the lower end of which is closed by the end wall C. This cylinder may be secured to the axle A by means of a side clamp plate 7 and bolts 8, secured against an enlargement 9 formed on the side of the cylinder 5. Or the cylinder may be secured in position by means of flanges 6' and axle embracing clamps 10, as shown in Fig. 2.

The cylinder 5 is provided with a threaded cap 11, on its upper end, and supporting posts 12 are secured by screws 13 to said cap 11. A tubular piston rod reciprocates in the cylinder 5 and slides through the gland 15, carried by the cap 11. The lower end of the piston rod 14 carries a piston head 16, which fits snugly against the cylinder wall, and this piston head 16 is provided with a downwardly opening check value 17, controlling the air passage 18, formed in said piston head 16.

The upper end of the piston rod 14 is pivotally connected with the vehicle frame B by means of the stirrup 19. Below the stirrup 19 longitudinal slots 20 are formed in the piston rod 14, through which a cross bar 21 extends, the outer ends of which are secured by nuts 22 to the posts 12. A second piston rod 23 has its upper end secured to the cross bar 21 and carries a piston head 24 on its lower end, which rides against the wall of piston rod 14 and is spaced a slight distance from the piston head 16, when said head 16 is at the limit of its upper position, so as to provide an air chamber 25. The piston rod 23 is formed with an air passage 26, which is shown to extend through the length of the same, but which may be deflected laterally at any point above the piston head 24. The lower end of the air passage 26 is controlled by a downwardly opening check valve 27. The cylinder 5 is provided with a small air opening 28, which is located just below the normal position of the piston head 16, the air in the chamber 29 being sufficient to sustain and cushion normal loads.

When the vehicle passes over an unusual depression or elevation on the road, the piston head 16 will be forced into the chamber 29 below the opening 28, the area of the chamber 25 will be increased, thus creating a vacuum in this chamber and forcing open the valve 27, whereby air will flow into said chamber. On the recoil of the piston head 16 the air in the chamber 25 will be forced into the chamber 29, thereby increasing the compression of the air in said chamber 29. The more frequent these vertical movements are the higher will be the compression, and the more perfect the cushioning action.

One of the devices is located at each corner of the vehicle, and the absorption of strains and jars will be so effective as to render the use of air tires unnecessary. If desired a dust cap may be secured around the cylinder.

Having described my invention I claim:—

1. A vehicle air cushion spring consisting of a cylinder attachable to the axle of a vehicle and formed with a closed end wall, a hollow piston rod attachable to the vehicle frame and provided on its lower end with a head movable in the cylinder and forming an air cushion, said head being provided with an air passage and a check valve, and a device in said hollow piston rod adapted to force air through said piston head, the air compressed in the cylinder alone serving to support the first piston in load sustaining position.

2. In an air cushion spring a main cylinder attachable to the vehicle axle, a hollow piston head movable in the cylinder and provided with a piston head on its lower end, means for securing said hollow piston to the vehicle frame, said hollow piston having longitudinal slots, a cross bar extending through said slots and having its ends secured to the main cylinder, a piston rod secured to said cross bar and having an air passage, a piston head on the lower end of the second piston rod and provided with a downwardly opening valve controlling the air passage thereof, said first piston head having an air passage, and a downwardly opening valve controlling said passage.

In testimony whereof I have hereunto set my hand in presence of two subscribing witnesses.

CHARLES I. DICKERSON.

Witnesses:
GLEN. E. DANIELS,
WILLIAM H. FITZWATER.